US006711166B1

(12) United States Patent
Amir et al.

(10) Patent No.: US 6,711,166 B1
(45) Date of Patent: Mar. 23, 2004

(54) SYSTEM AND METHOD FOR PACKET NETWORK TRUNKING

(75) Inventors: Amos Amir, Tel Aviv (IL); Danny Levin, Herzilya (IL); Amotz Shemi, Herzliya (IL)

(73) Assignee: Radvision Ltd., Tel Aviv (IL)

( * ) Notice: Subject to any disclaimer, the term of this patent is extended or adjusted under 35 U.S.C. 154(b) by 0 days.

(21) Appl. No.: 08/987,972

(22) Filed: Dec. 10, 1997

(51) Int. Cl.$^7$ ............................................... H04L 12/56
(52) U.S. Cl. ................................. 370/395.1; 370/395.52
(58) Field of Search ................................. 370/352, 353, 370/354, 355, 356, 357, 360, 389, 392, 395, 400, 401, 402, 403, 404, 405, 535, 536, 537, 538, 540, 466, 467, 395.1, 395.2, 395.3, 395.31, 395.52

(56) References Cited

U.S. PATENT DOCUMENTS

| | | | | |
|---|---|---|---|---|
| 5,021,949 A | * | 6/1991 | Morten et al. ............... | 709/231 |
| 5,287,535 A | * | 2/1994 | Sakagawa et al. ........... | 370/389 |
| 5,528,595 A | * | 6/1996 | Walsh et al. ................. | 370/402 |
| 5,970,130 A | * | 10/1999 | Katko | |
| 6,028,848 A | * | 2/2000 | Bhatia et al. ............... | 370/257 |
| 6,038,219 A | * | 3/2000 | Mawhinney et al. ........ | 370/242 |
| 6,064,653 A | * | 5/2000 | Farris .......................... | 370/237 |
| 6,111,873 A | * | 8/2000 | Mandalia et al. ........... | 370/352 |
| 6,212,175 B1 | * | 4/2001 | Harsch ........................ | 370/338 |
| 6,304,567 B1 | * | 10/2001 | Rosenberg .................. | 370/356 |

FOREIGN PATENT DOCUMENTS

| | | |
|---|---|---|
| DE | 19709248 | 10/1997 |
| WO | WO 9634507 | 10/1996 |
| WO | WO 9730554 | 8/1997 |

OTHER PUBLICATIONS

"Client–Server Computing \ Time–Shared Computing", Communications Of The Association For Computing Machinery, vol. 35, No. 7, Jul. 1, 1992, pp. 77–98, ISSN: 0001–0782.

"H.323 The Multimedia Communications Standard For Local Area Networks", IEEE Communications Magazine, vol. 34, No. 12, Dec. 1, 1996, pp. 52–56, ISSN: 0163–6804.

"Internetworking with TCP/IP: Principles , Protocols and Architecture", Douglas E. Comer, Prentise Hall, 1996, ISBN –0132169878.

H.323 version 2 : "Packet Based Multimedia Communication Systems " ITU–T 1998.

Understanding the Voice Enabled Internet, Ed. Marguiles, Flatiron Publishers Inc., 1996, ISBN–0–9366448–91–0 on the World Wide Web at pulver.com.

ITU–T Recommendation H.323, "Visual Telephone Systems and Equipment for Local Area Networks Which Provide a Non–Guaranteed Quality of Service", 1996.

\* cited by examiner

*Primary Examiner*—Kwang Bin Yao
(74) *Attorney, Agent, or Firm*—O Eitan, Pearl, Latzer & Cohen Zedek, LLP

(57) ABSTRACT

Concurrent calls are multiplexed over packet network connections such as TCP/UDP/IP connections. Initially, semi-permanent, open channels (e.g., TCP and/or UDP channels) are established between two or more packet switches. The switches format incoming calls, as necessary, and multiplex them onto the open channels. Identifiers may be added to the multiplexed calls to facilitate the demultiplexing of the calls by the receiving switch. The multiplexed calls are encapsulated into packet network protocol packets (e.g., TCP/IP or UDP/IP) for routing over a packet-based network (e.g., IP).

28 Claims, 10 Drawing Sheets

SYSTEM AND METHOD FOR PACKET NETWORK TRUNKING

FIELD OF THE INVENTION

The present invention relates to the routing of packet data over a network and, more specifically, to a system and method for multiplexing multiple calls onto a single or a few channels on an Packet Network.

BACKGROUND OF THE INVENTION

Packet data networks transfer packet data between computers, IP telephones, video devices, computer telephony interface servers and other equipment. In a packet network, the stream of data from a data source is divided into variable or fixed length "packets" of data before it is sent over the network. The packets are then reassembled at the destination to regenerate the stream of data. Typically, the techniques of packetizing data may make more efficient use of the data transmission facilities than methods (e.g. real time applications) that use dedicated connections between each source and destination (e.g., conventional telephone switching systems).

To enable the network to route the packet data to the appropriate destination, information (referred to as a header) is added to the data for each packet. A typical header contains the address of the source, the address of the destination and more information on the content of the packet.

A header may include information for setting up the connection between the endpoints and it may include information used to determine whether the connection has failed. In addition, information that is used to ensure that the data was sent without any errors may also be imbedded in the header. In practice, the format of the packet header and other packet routing details are defined by a protocol.

One of the more popular packet network protocols is the TCP/IP (Transmission Control Protocol/Internet Protocol) suite of protocols. The Internet Protocol ("IP") relates to the data networking functions of routing a packet through the network. IP defines a frame of data including an IP header and the associated data (the "payload"). The network forwards the packet based on the network address contained in the IP header.

IP does not provide data flow control or error control. These functions are left to the Transmission Control Protocol ("TCP"). Thus, applications ensure the integrity of the data being sent over the network by sending TCP massages to one another. These messages are encapsulated in the IP messages which, as discussed above, are primarily used for routing the data to the proper destination in the network.

Applications that can waive the rigorous flow and error control that TCP provides may instead use the User Datagram Protocol ("UDP"). In general, UDP provides simpler data transmission than TCP because there is not as much overhead associated with error control. Both TCP and UDP define a frame which includes an associated header.

A TCP/IP (or UDP/IP) frame thus consists of the IP header and its payload. The IP payload, in turn, consists of the TCP (or UDP) frame and its payload. The TCP (or UDP) payload consists of the data being transmitted. This data may include other protocol information (e.g., H.323 discussed below), depending on the application.

In a simple example of a TCP/IP-based application, two switches (e.g., gateways or routers), both of which are connected to the IP network, are connected to several terminals that are connected to another network (typically a switched circuit network or a packet network). For real-time call applications the terminals (e.g., telephones, computers or video devices) send and receive signals (e.g., voice or video signals or digital data) to and from the associated switch. As necessary, each switch converts the incoming (and outgoing) signals to (and from) the TCP/IP format.

To transfer data through the network, the switches first set up a connection. A connection may be established, for example, using a three-way handshake. Briefly, this operation involves the transmission of a series of synchronization signals and sequence numbers between the switches. In the TCP vernacular, this operation opens a TCP connection. The TCP connection is associated with a pair of TCP sockets, one for each of the two switches. Each socket consists of an IP address and a port.

Once a TCP connection is open, the switches simultaneously monitor their respective TCP ports to perform any necessary TCP control operations. These operations would include, for example, flow control, error detection and data retransmission, each of which is performed independently for each connection.

When the number of calls to be exchanged between the switches is large, the above setup and monitoring operations reduce the efficiency of the network and the switches. In particular, the switches need to open, maintain and close several connections per call. In addition the three-way handshake reduces the speed at which each connection may be set up. The monitoring operations and the memory allocation for each connection use a significant amount of the resources of the switches. The overhead associated with the headers reduces the data throughput. Also, the communications exchanged to open and close channels burden the network and reduce the available bandwidth. Thus, a need exist to improve the efficiency of data transfers in a packet-based network.

SUMMARY OF THE INVENTION

The invention provides a system and method for routing concurrent calls between switches connected to a wire-based, wireless or satellite packet network (e.g., a TCP/UDP/IP network). The incoming calls to the switches (e.g., those originating from the terminals connected to each switch) are multiplexed onto a single TCP or UDP channel (or relatively few channels as discussed below). Thus, the multiplexed calls are treated as a single connection. As a result, the switches do not allocate and set up individual TCP or UDP connections for each call. Instead, calls are established using a simplified connection setup procedure.

Prior to routing the calls, the switches set up a "permanently" open TCP connection (and UDP connection, if necessary) between one another. This connection, referred to as an IP trunk, is permanent in the sense that it is not set up and torn down on a call-by-call basis. Instead, in general, it is set up to make the connection available for use (for example, when the switch is powered-up), irrespective of whether there is a call that presently needs to be sent through the trunk. Similarly, the trunk is not necessarily torn down merely because no calls are presently using the connection. Rather, it typically is torn down based on other considerations (for example, when the switch is powered-down).

After the trunk connections (i.e., the permanent TCP and UDP connections) are opened, the data streams from the incoming calls are multiplexed onto the connections according to the transport protocol type. Thus, multiple TCP data streams are muliplexed onto the permanent TCP connection. Multiple UDP data streams are multiplexed onto the permanent UDP connection.

In one embodiment, when a call is made to a switch, the switch adds a header to the call data. The header includes, for example, relatively simple two-way call setup information and an identifier. The switch on the receiving end uses the identifier to demultiplex the incoming data on the trunk into the individual streams of data for each of the calls.

In another embodiment, the switches provide multiple IP trunks to handle the call traffic. Yet, typically, the number of trunks is significantly smaller than the number of calls. As above, the switches do not perform TCP/UDP call setup and monitoring for each call. Instead, each call is multiplexed onto one of the trunks using simplified call setup procedures. The calls are multiplexed according to selected call distribution criteria.

The invention thus provides a way to achieve more efficient data transfer and to use the resources of the switches and the network more efficiently. The simplified call setup procedure for each call reduces the call setup time. The routing of multiple calls through a single trunk (or relatively few trunks) results in less overhead being required for each call, thereby reducing network traffic and bandwidth requirements. Moreover, the switches do not monitor each individual call. Rather, they only monitor the trunks (i.e., the permanent TCP and UDP connections). Thus, a system constructed according to the invention may use the processing resources of the switches more efficiently in comparison to many conventional systems.

BRIEF DESCRIPTION OF THE DRAWINGS

These and other features of the invention will become apparent from the following description and claims, when taken with the accompanying drawings, wherein similar references characters refer to similar elements throughout and in which:

DESCRIPTION OF EXEMPLARY EMBODIMENTS

Figure 1:
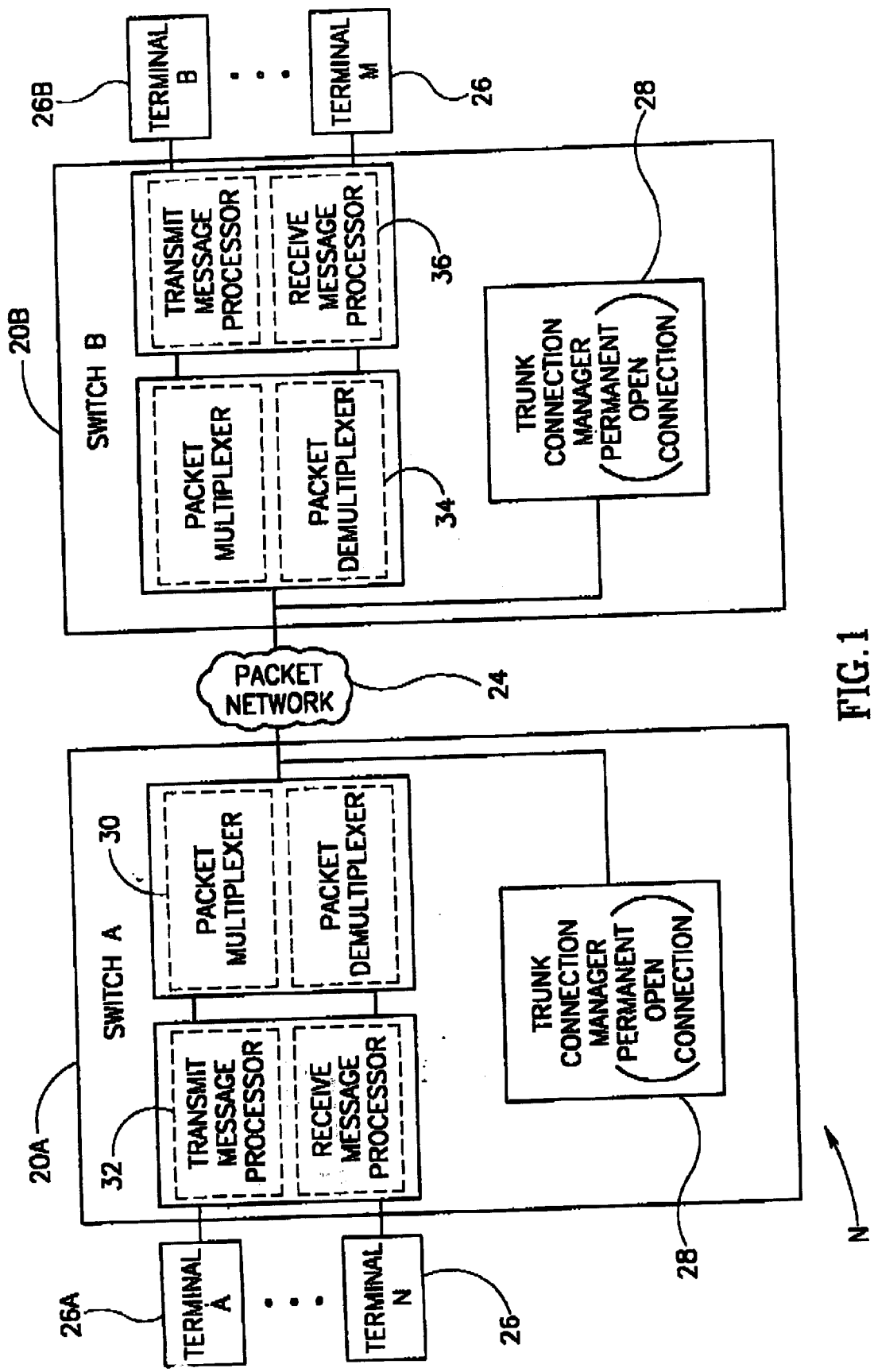
FIG. 1 is a block diagram of one embodiment of a data communications network employing call multiplexing according to the invention.

FIG. 1 depicts a block diagram of a data communications network N that utilizes the call multiplexing feature of the invention. A pair of switches (e.g., gateways), switch A 20A and switch B 20B, route data to each other over a packet network 24 (e.g., IP-based). Each switch is connected to several terminals 28 that send and receive analog or digital signal streams to and from their associated switch. An exemplary data flow in the network N involves sending information from terminal A 26A (left) to terminal B 26B (right). Switch A 20A processes the signal stream from terminal A 28A and passes data packets to the network 24. The network routes the data to switch B 20B. Switch B 20B processes the data, as necessary, and routes it to terminal B 26B.

In accordance with one possible implementation of the invention, each switch 20 multiplexes the information from its associated terminals onto a single TCP connection (i.e., the IP trunk). To this end, trunk connection managers 28 in each switch 20 cooperate to establish a permanent TCP connection between the switches via the network 24. This TCP connection is in most respects a "normal" TCP connection except that is not set up and torn down with each call from the endpoints (e.g., terminals 26). Instead, the connection remains open (typically passively open) as calls come and go.

When a terminal (e.g., 26A) needs to set up a call to a terminal (e.g., 26B) on the remote end, a transmit message processor 32 in the associated switch (e.g., 20A) encapsulates the call setup messages (e.g., OPEN) within TCP packets. In particular, the transmit message processor 32 generates headers that contain call setup, message type and identifier information. These headers are then associated with the data packets for each call.

After the encapsulated messages are generated, a packet multiplexer 30 in the switch multiplexes the packets onto the TCP connection. The network 24 routes the TCP messages to the switch at the remote end (e.g., switch B 20B). A packet demultiplex 34 in switch B 20B reads the identifier information imbedded in the header to demultiplex the data associated with each call. A receive message processor 36 reads the header information for each call and performs the appropriate operations. The receive message processor 36 then strips the header related to the trunk from the packet and routes the packet to the endpoint (e.g., terminal 26B) designated for the call.

Figure 2A:
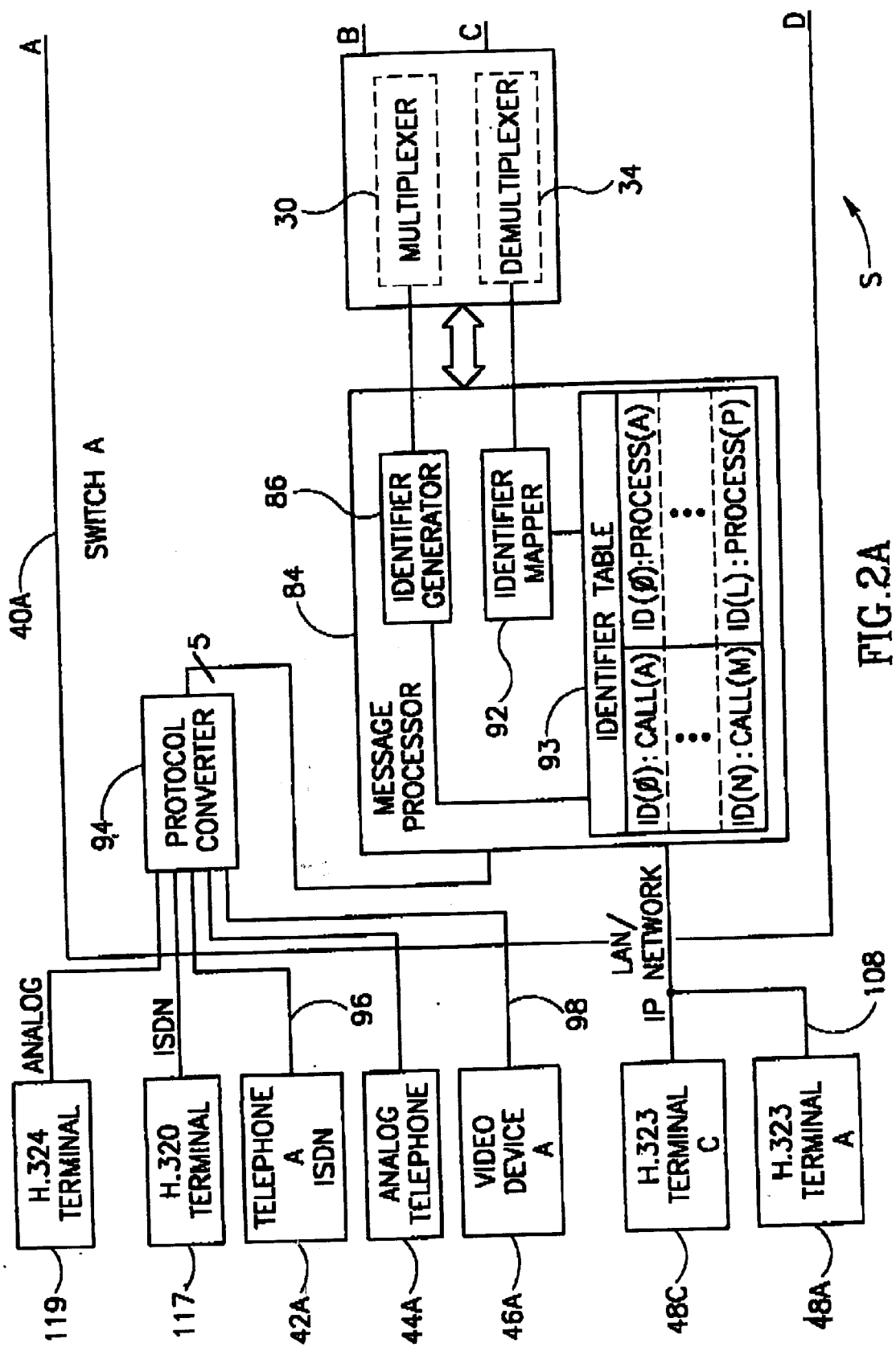
FIGS. 2A and 2B are a block diagram illustrating additional details for one embodiment of a switching system constructed according to the invention.
Figure 2B:
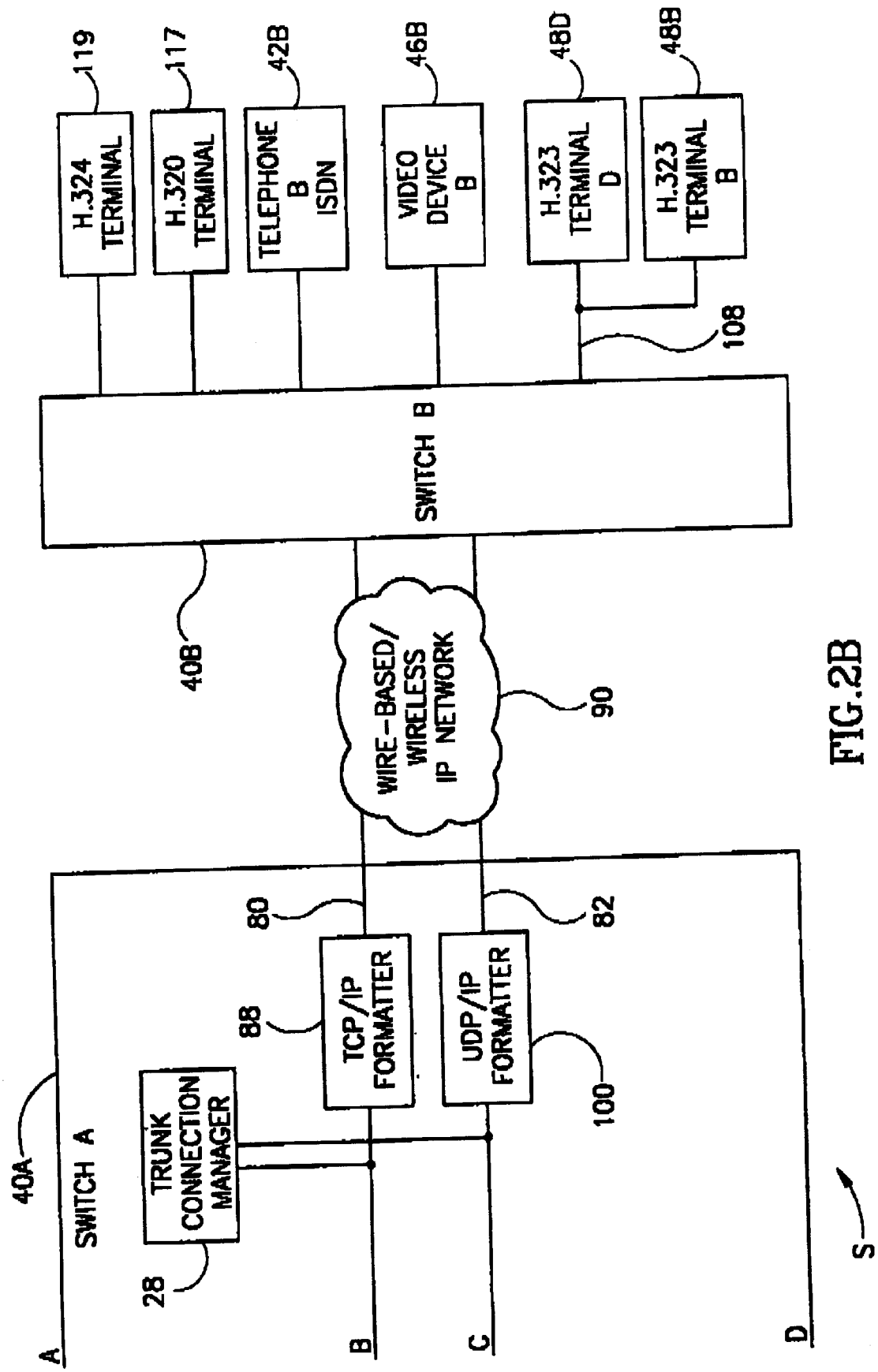
Figure 3A:
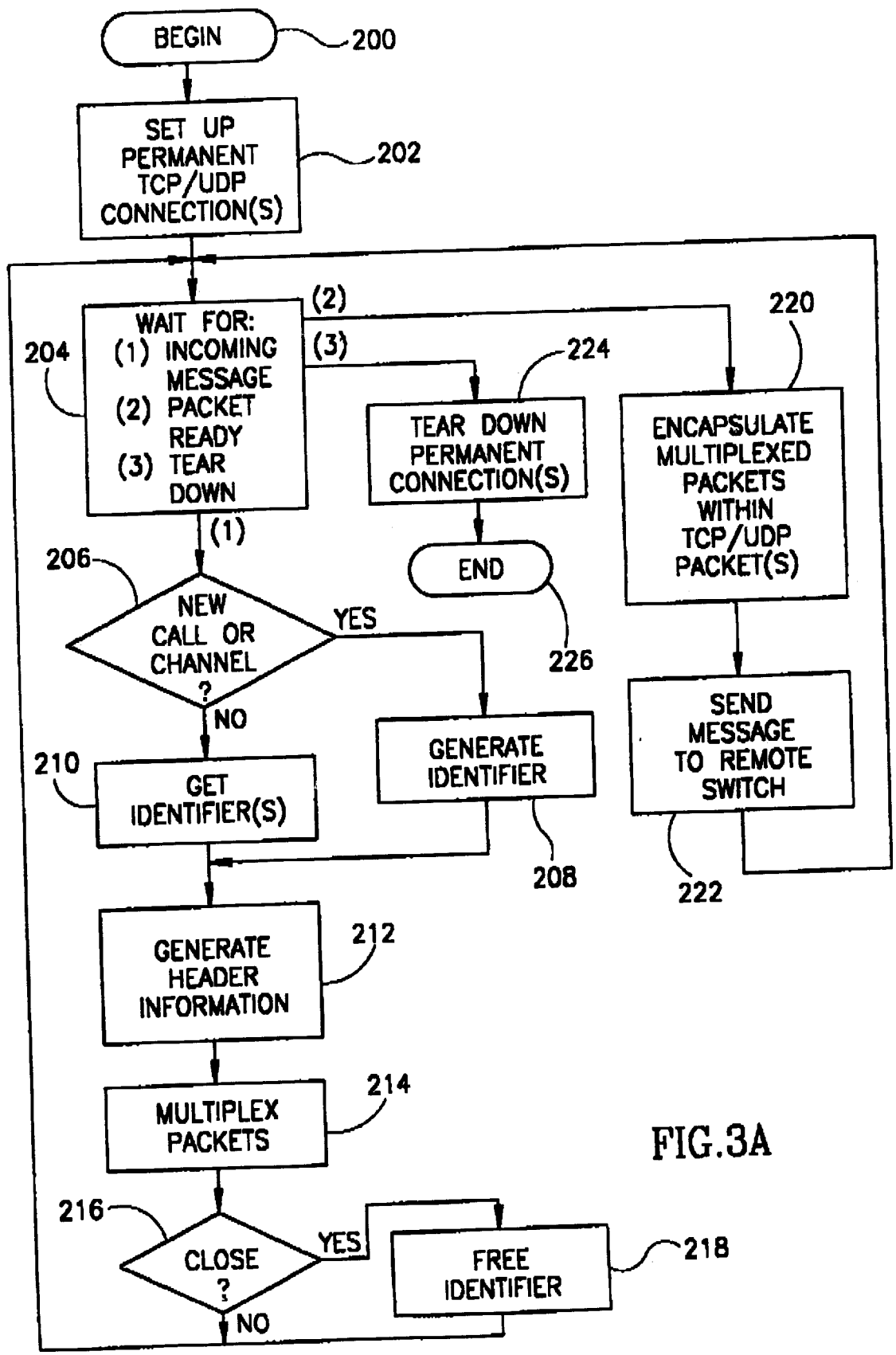
FIGS. 3A and 3B are flowcharts illustrating IP trunking operations that may be performed by the system of FIG. 2.
Figure 3B:
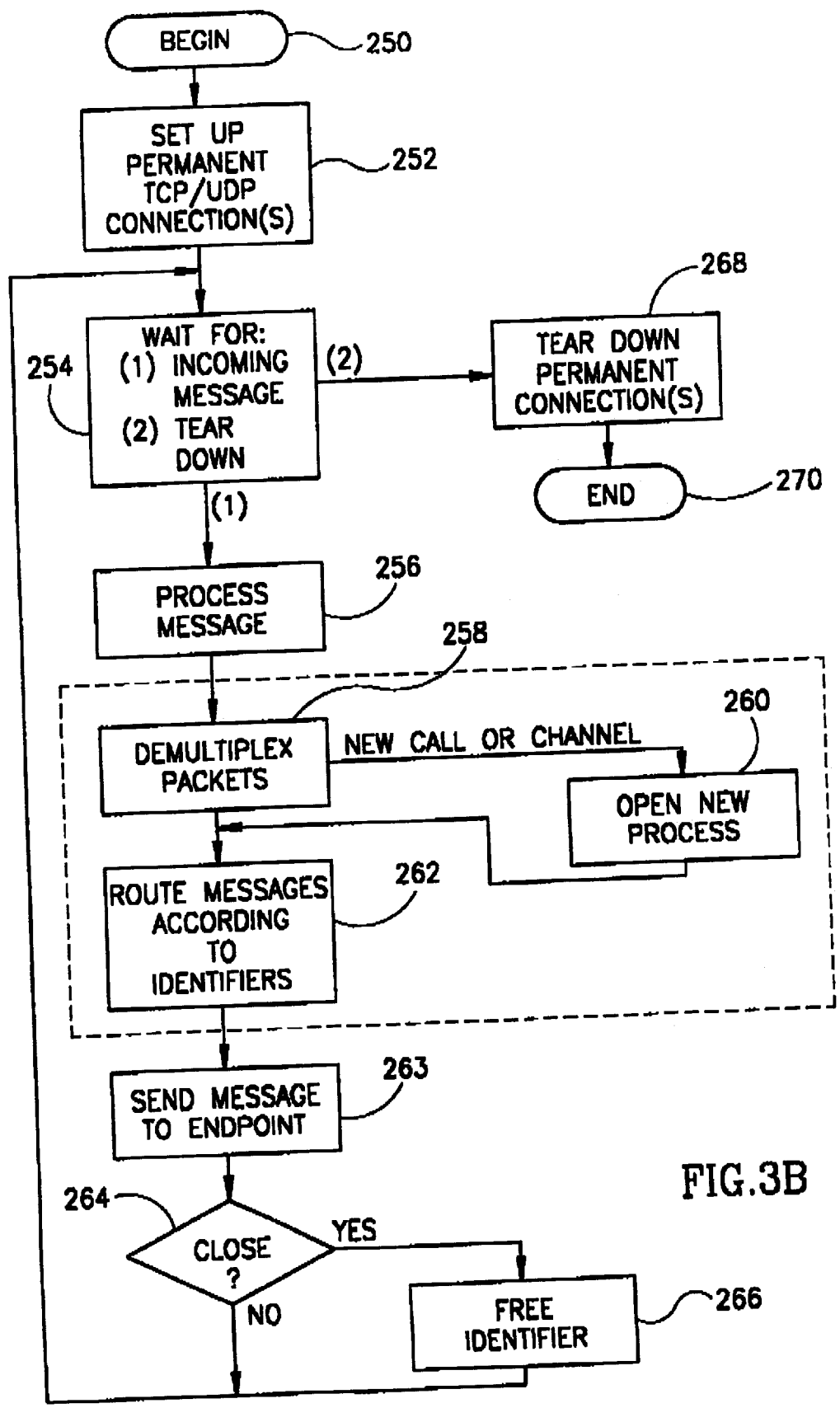

With the above high-level description in mind, exemplary structures and operations of the invention are treated in more detail in FIGS. 2A, 2B, 3A and 3B. FIGS. 2A and 2B (referred to hereafter as FIG. 2) depict an embodiment of a data communications system S that supports the ITU-T standard H.323. FIGS. 3A and 3B illustrate IP trunking operations performed by the embodiment of FIG. 2.

Referring to FIG. 2, calls from several terminals are routed to remote terminals via a pair of switches 40 (e.g., gateways) that are connected via an Internet or Intranet data network 90. The system S supports terminals running several different protocol standards. For example, the telephones may support the Integrated Services Digital Network ("ISDN") protocol (telephone A 42A), the telephones may be standard analog sets (telephone 44A) or they may support some other protocols (e.g., CORRNET by Siemens). The data terminals may be protocol-based, e.g., H.323, H.324 and H.320. Those depicted are H.323 terminals 48, H.320 terminals 117 and H.324 terminals 119. The H.323 protocol is discussed in more detail below.

In accordance with the present invention, the switches 40 perform IP trunking. Thus, the switches 40 multiplex the calls from the terminals onto an IP trunk. The basic multiplexing operation performed by the switches is the same as discussed above in conjunction with the embodiment of FIG. 1. In addition, FIG. 2 explicitly illustrates the previously mentioned H.323 and UDP components.

The H.323 protocol is the ITU-T (the telecommunications standardization section of the International Telecommunications Union) protocol standard for multimedia conferencing over packet switched networks, specifically, voice, data, video and multimedia over IP. H.323 defines the protocols to be used for these various types of information (e.g., G.711 for audio, H.261 for video) and other signaling and control functions. The H.323 standards, including specifications for H.323-based terminals, gateways, etc., may be found in the documents: ITU-T Recommendation H.323, "Visual Telephone Systems and Equipment for Local Area Networks Which Provide a Non-Guaranteed Quality of Service", 1996; H.323 version 2: "Packet Based Multimedia Communication Systems", ITU-T 1998 (to be published), the contents of both of which are incorporated herein by reference.

Referring to FIGS. 3A and 3B, the IP trunking operation performed by the system of FIG. 2 will be discussed in more detail. Specifically, beginning at block 200, FIGS. 3 and 3B describe exemplary IP trunk setup, call setup and message transmission operations for the switch that originates a call and the switch that receives the call, respectively.

At block 202, a trunk connection manager 28 (FIG. 2) in one of the switches (e.g., switch A 40A) initiates connection procedures for a TCP-based IP trunk 80 and a UDP-based IP trunk 82. The TCP connection setup is done in a standard way, e.g., it uses a three-way handshake. Following UDP protocol, the trunk connection managers 28 also cooperate to open the UDP-based IP trunk 82.

After the connection establishment procedure is completed for the trunks, the switches perform the normal call maintenance operations for open TCP and UDP connections. The details of the TCP/UDP/IP protocols are well known in the data communications art. For example, detailed descriptions of exemplary implementations and related structures may be found in the book: *Internetworking With TCPI/IP; Principles, Protocols and Architecture*, Douglas E. Comer, Prentise Hall, 1996, ISBN-0132169878, the contents of which is incorporated herein by reference. Accordingly, these aspects of the embodiments described herein will not be discussed further.

At block 204, the switches 40 "wait" for the next task that needs to be performed. In practice, task initiation could be implemented in a variety of ways including polling, interrupts, task scheduling, etc. Three tasks are of particular relevance here: (1) a message has been received from an endpoint (e.g., terminal A 48A); (2) a TCP or UDP packet is ready to be sent over an IP trunk; or (3) a permanent connection is to be terminated.

If a message has been received, the process proceeds to block 206. At this point, the process determines whether the message relates to a new call or channel. For example, if terminal A 48A (FIG. 2, lower left) has sent an H.323 SETUP message to SWITCH A 40A to establish a call with terminal B 48B (lower right), the process proceeds to block 208 and generates the appropriate identifiers (discussed below). If this was not a new call, the switch retrieves the previously defined identifiers associated with the incoming message process (block 210).

Figure 4:
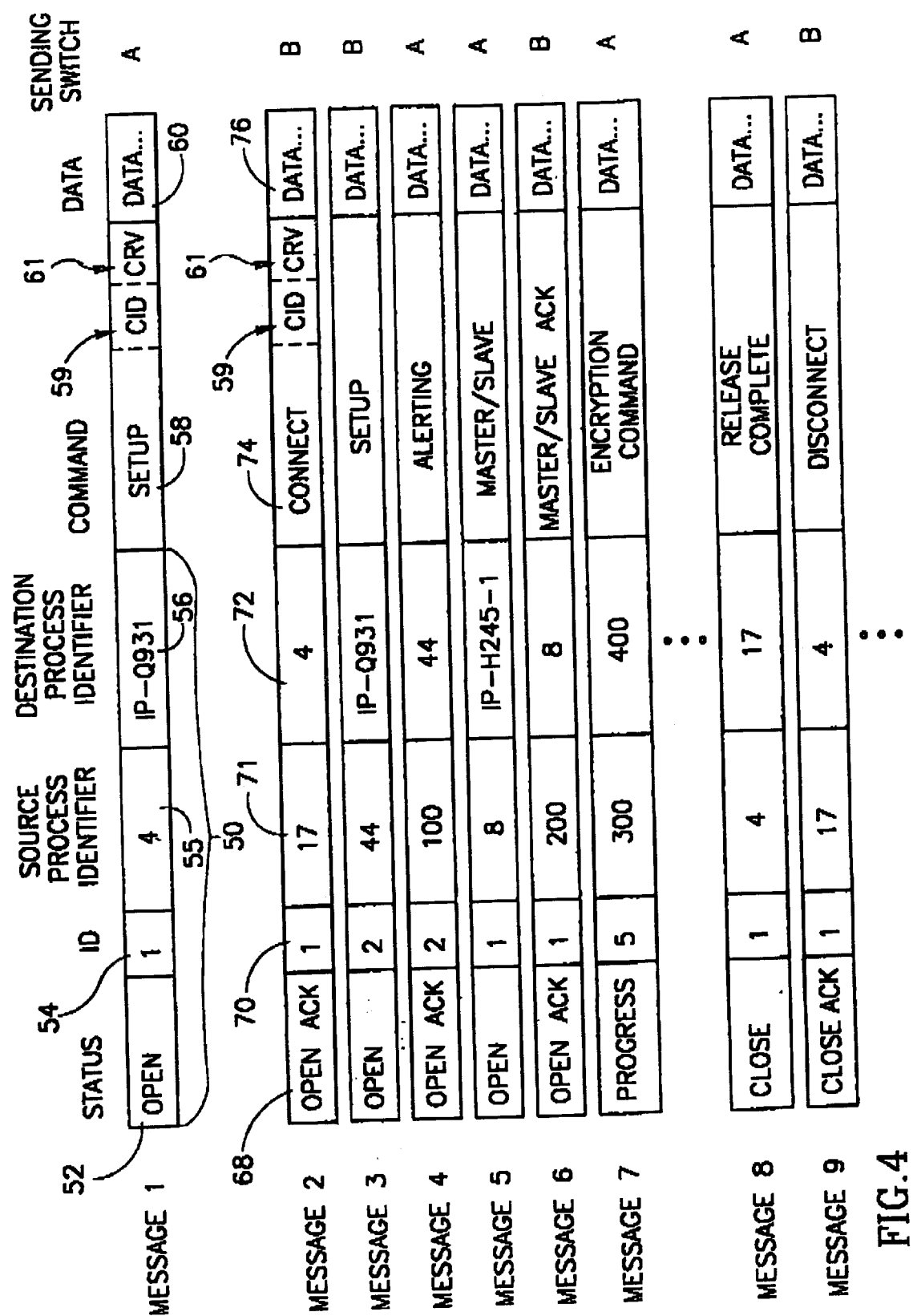
FIG. 4 is a graphical representation of a message structure used in the multiplexing operation of one embodiment of the invention.

At block 212, a message processor 84 generates a header to be appended to the H.323 data. Typical headers are depicted in the messages shown in FIG. 4. (FIG. 4 depicts an exemplary sequence of messages sent between switch A and switch B over the IP trunk. These messages will be referred to throughout this specification.) The message header 60 typically includes basic call setup and flow control information. The rest of the message consists of the original H.323 packet from the endpoint.

MESSAGE 1 in FIG. 4 is an example of a message that could be sent to set up an H.323 call. The first field 52 in the header contains the message status. Because this is the first message in the call, the message contains call setup information: "OPEN" indicates that this message is opening a new call process. In order to reduce the number of exchanged messages, the trunk message "OPEN" is associated with the call message "SETUP" (discussed below).

The second field 54 contains an identifier. An identifier generator 86 (FIG. 2) assigns a unique identifier (the number "1" in this example) to each call (as discussed above in conjunction with block 208 in FIG. 3A). In one embodiment, each message (from a given endpoint) that is associated with a particular call will contain the same identifier. For example, MESSAGE 5 (an example of a message that could be used to open an H.245 channel for the call) contains the same identifier (in field 54) as MESSAGE 1.

The next two fields typically contain other identifters that may be used in some embodiments. The third field 55 (source process identifier) contains an identifier that is assigned to an individual process at the source switch associated with a call. For example, in a typical call, several TCP and UDP connections are opened. In addition, other messages associated with signaling and other processes may be sent during the course of a call. In this case, there will be a unique identifier associated with each process even though they are all associated with the same call.

The identifier generator 86 (FIG. 2) assigns the identifier (the number "4" in this example) to each process (block 208, FIG. 3). Each message (from a given endpoint) that is associated with a particular process will contain the same identifier. For example, MESSAGE 8 (an example of a message that could be used to close the call, again, the trunk message "CLOSE" is associated with the call message "RELEASE COMPLETE") contains the same source process identifier as MESSAGE 1.

It will be appreciated that the identifiers may be implemented in a variety of ways. For example, in some applications it may be desirable to use only one of the above types of identified. Also, identifiers could be associated with messages in ways other than on a per call or per process basis. In addition, certain commands have fields within which identifiers may be sent. For example, as depicted in FIG. 4, H.323 SETUP and CONNECT messages have a call identifier field (CID 59) and a call reference value field (CRV 61). Similar fields exist in H.323 Registration Admission Status ("RAS") messages. These and other fields may be used to pass identifiers in accordance with the present invention.

The fourth field 56 (destination process identifier) typically contains the identifier assigned to the process by the remote switch. However, during call setup, this field may be used to identify the H.323 message type. The designation "IP-Q.931" signifies that MESSAGE 1 is a Q.931 call signaling message. Thus, it may contain messages of the types: SETUP, CONNECT, ALERTING, CALL PROCEEDING, etc.

The remaining fields contain the H.323 protocol message sent by terminal A 48A. The fifth field 58 contains the H.323 command. In this case, the H.323/Q.931 SETUP message sent by terminal A. The original H.323 packet data is embedded in the data (payload) 60 portion of MESSAGE 1. Significantly, it may be seen that the system can pass data beginning with the first message of the original call.

Referring again to FIG. 3A, at block 214 the multiplexer 30 (FIG. 2) multiplexes the encapsulated message (e.g., MESSAGE 1) with other encapsulated messages (assuming that there are other calls currently being routed through the IP trunk).

At block 216, if the outgoing message is terminating a call or process (e.g., as in MESSAGE 9 in FIG. 4. the status is "CLOSE ACK"), an appropriate message is sent to the message processor 84. The message processor 84 then clears or reallocates the identifier (call or process) so that it may be used for another call or process (block 218).

Figure 5:
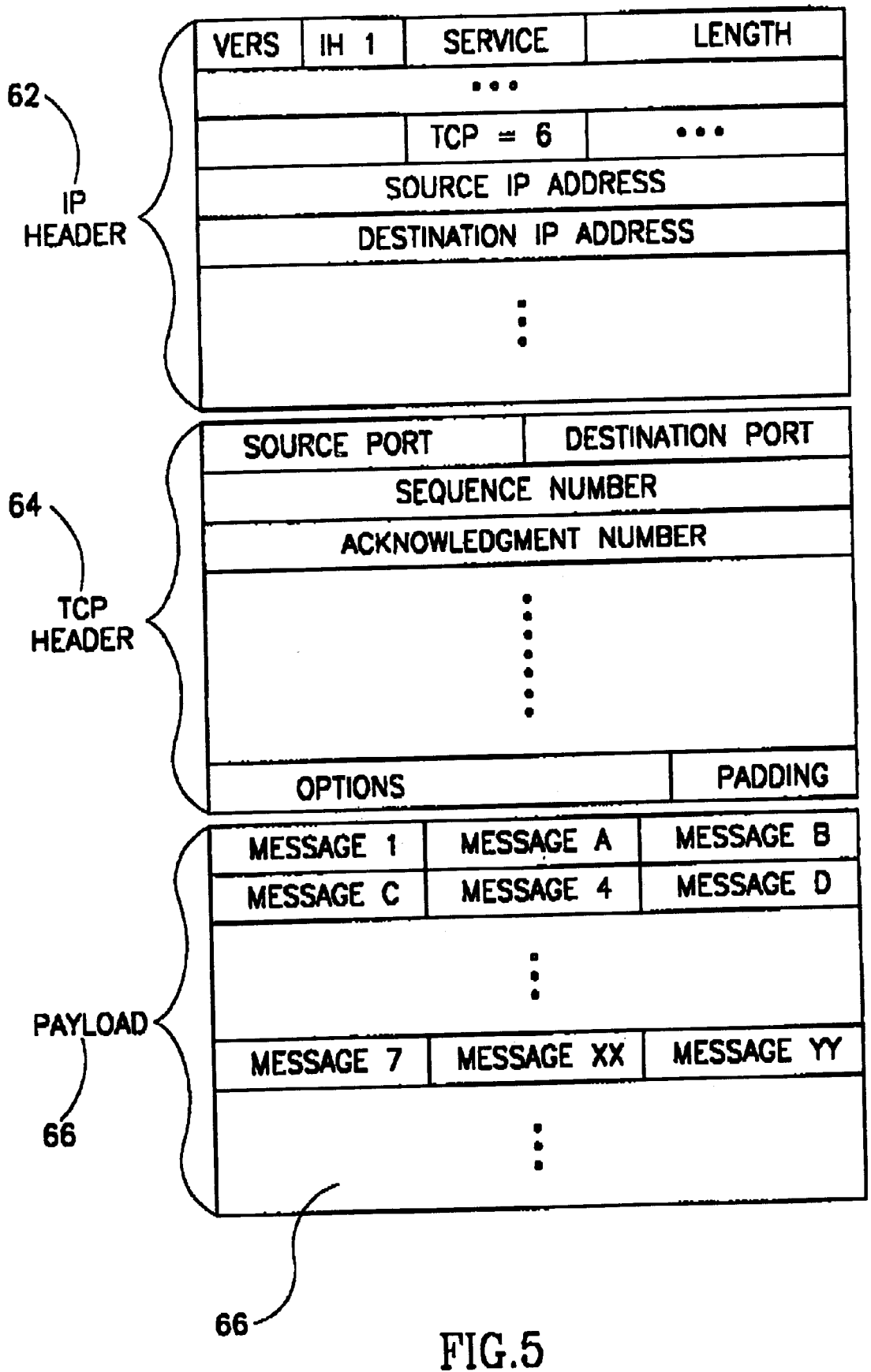
FIG. 5 is a graphical representation of a modified TCP/IP packet.

The message processing operation then returns to block 204. If at block 204 a packet is ready to be sent over the IP trunk, the process proceeds to block 220. Assuming that this is a TCP channel, a TCP/IP formatter 88 encapsulates the packets into a TCP/IP packet. (If the channel was UDP, for example, H.323 voice, a UDP/IP formatter 100 encapsulates the packets into a UDP/IP packet) An exemplary TCP/IP packet with an IP header 62 and a TCP header 64 is depicted in FIG. 5. In this example, the encapsulated packets are embedded in the TCP payload 66.

Referring again to FIGS. 2 and 3A switch A 40A sends the TCP/IP (or UDP/IP) packet that includes MESSAGE 1 to switch B 40B over the TCP-based IP trunk 80 (or UDP-based IP trunk 82) established through the network 90 (block 222). In practice, the bunk may use H.323 call procedures or call procedures for other TCP/UDP/IP-based protocols. The call processing procedure again returns to block 204.

Summarizing, switch A has now trunked call 1, opened a Q.931 TCP port associated with source process identifier 4 and sent the SETUP message.

Referring now to FIG. 3B, exemplary call processing operations for the switch that receives the call (e.g., switch B 40B) are treated beginning at block 250. To reduce the complexity of FIG. 2, the details of switch B 40B, which are the same as the details of switch A 40A, are not shown. As above, at block 252 switch B sets up the IP trunk(s). Then, at block 254, switch B 40B "waits" for a task: (1) a message has been received over the IP trunk; or (2) a permanent connection is to be terminated.

When switch B 40B receives a TCP/IP (or UDP/IP) packet, the process proceeds to block 256. A TCP/IP formatter 88 (or UDP/IP formatter 100) processes the incoming packet.

At blocks 258 through 262, a demultiplexer 34 demultiplexes the encapsulated packets (e.g., MESSAGE 1). Preliminarily, the message header is read to determine whether a new process needs to be opened to handle the message (e.g., does the status field 52 contain "OPEN"). If so, appropriate processing is performed at block 260 to handle the message (e.g., reading the destination process identifier to determine the message type; initiating corresponding processes).

At block 262, the demultiplexer 34 routes the calls based on the received identifier (e.g., the identifier 54 and/or the source process identifier 55). To this end, an identifier mapper 92 compares the incoming identifier with the identifier entries in an identifier table 93 (FIG. 2) that map each identifier with, for example, a specific call or process.

Next, the message processor 84 sends the message to the appropriate endpoint (block 263). Continuing with the above example, switch B 40B thus sends the H.323 SETUP message to terminal B 48B.

At block 264, if the incoming message is terminating a call or process (e.g., status is "CLOSE ACK"), an appropriate message is sent to the message processor 84. The message processor 84 then clears or reallocates the identifier (call or process) so that it may be used for another call or process (block 266). For example, the identifier mapper 92 may remove the entry for that identifier from the identifier table 93. The call processing operation then returns to block 254 to process the next incoming message.

To complete the explanation of the call setup procedure, a brief description of the response from terminal B to the H.323 SETUP message follows. Per standard H.323 procedures, terminal B 48B sends a CONNECT message to switch B 40B. Switch B performs similar message processing on the H.323 message from terminal B as was performed by switch A on the message from terminal A 48A.

For example, switch B may generate a message having the form of MESSAGE 2 in FIG. 3. The first field 68 in the header contains the status "OPEN ACK" indicating that this message is acknowledging an "OPEN" message. The second field 70 contains an identifier (number "1" indicating that this message is associated with the same call with which MESSAGE 1 is associated).

In the third field 71, the number "17" is the Identifier assigned by switch 8 to this Q.931 channel process. The fourth field 72 contains the identifier (number "4") assigned to this call by the other (40A). This is used by the other switch to associate this message with the correct call of the proper endpoint (i.e., terminal A). MESSAGES 1 and 2 illustrate that the switches associated with each endpoint may assign different identifiers to the messages associated with a given call and a given channel.

The fifth field 74 contains the H.323 message, namely, the H.323/Q.931 CONNECT message sent by terminal B 48B. In the same manner as described for MESSAGE 1, the original H.323 message (or command) is embedded in the payload portion (fields 74 and 76) of MESSAGE 2.

The message is encapsulated in a TCP/IP packet that is sent to switch A 40A. Summarizing again, switch B 40B has now acknowledged call 1, opened a Q.931 port associated with its source process identifier 17, acknowledged the Q.931 port associated with source process identifier 4 of switch A, and sent the CONNECT message received from terminal B.

Switch A 40A processes the packet as discussed above, and sends the CONNECT message to terminal A 48A At this point the call is established and the terminals can send other messages for this call.

MESSAGES 5 and 6 are examples of messages for call 1 that may be sent over the IP trunk at some later point in time. MESSAGE 5 is used to open the first H.245 channel for call 1. Switch A 40A opens a process with associated source process identifier "8" and sends a master-slave determination message. Per MESSAGE 6, switch B 40B acknowledges the H.245 open, opens its press (identifier 200), acknowledges the process (identifier 8) for switch A, and acknowledges the master-slave determination message.

The messages for a call are transferred in a similar manner as described above until the call is torn down. MESSAGES 8 and 9 illustrate an exemplary call termination procedure for call 1. Terminal A 48A initiates the procedure by sending an H.323 "RELEASE COMPLETE" message to terminal B 48B over the Q.931 channel for call 1. Switch A 40A appends the "CLOSE" status and the identifiers corresponding to those of the Q.931 open messages and sends the message to switch B 40B which relays the H.323 message to terminal B 48B. Terminal B responds by sending a "DISCONNECT." Switch B appends the "CLOSE ACK" status and the identifiers and sends the message to switch A. Switch A 40A relays the "DISCONNECT" to terminal A 48A.

Once the "CLOSE ACK" has been received by switch A 40A, the identifiers (e.g., 4 and 17) are free to be used for other calls and processes. Thus, the identifiers are reallocated as discussed above in conjunction with blocs 216 and 218 of FIG. 3A and blocks 264 and 266 of FIG. 3B.

At some point in time, the IP trunk may need to be torn down (i.e., the permanent TCP and UDP connections disconnected). Either switch can initiate tearing down the IP trunk as depicted in FIG. 3A at block 224 and FIG. 3B at block 268. The details of basic TCP/UDP call disconnect procedures am also well known in the art. Reference may be had to the materials cited above. The IP trunking operations for FIGS. 3A and 3B thus terminate at blocks 226 and 270, respectively.

As depicted in FIG. 4, a system cored according to the invention multiplexes a variety of call types originating from a variety of endpoints onto the IP trunk. MESSAGE 3, for example, may be for a call (call 2) from terminal D 48D to terminal C 48C. Switch B 40B opens the Q.931 port (source process identifier 44) and the SETUP message is relayed through switch A 40A to terminal C 48C. Terminal C 48C sends a Q.931 "ALERTING" message to acknowledge call 2. Switch A 40A opens a Q.931 process (identifier 100), acknowledges the Q.931 process for call 2 on switch B 40B, and sends the H.323 "ALERTING" message. It will be understood that a wide variety of message types can be sent over the trunk. For example, H.323 has many different channels, e.g., Q.931(TCP) and RAS (UDP).

Multiplexing according to the invention is further illustrated by the multiplexed data 66 in FIG. 5. In this example, MESSAGES 1, 4 and 7 (from FIG. 4) are multiplexed into a single packet. MESSAGES 1 and 4 were discussed above. MESSAGE 7 is a message for an existing call (status= "PROGRESS") designated as call 5. Ports on the two switches have been allocated and confirmed to support an H.245 channel for the call. The H.323 message being sent is an example of a control message for data encryption.

It will be understood that the sequence depicted for the messages in FIG. 4 is merely illustrative. In practice, MESSAGE 2 will be sent some time later than MESSAGE 1 and will travel the opposite direction over the IP trunk. The same relationship exists between MESSAGES 3 and 4 and between MESSAGES 5 and 6. MESSAGE 7 is unrelated to any other message shown. MESSAGES 8 and 9 will be sent some time after MESSAGES 1 and 2.

The call procedures for voice and video connections are similar in most respects to those discussed above. For example, when telephone A 42A (or video device A 46A) initiates a call to telephone B 42B (or video device B 468), a protocol converter 94 converts the voice signals (video signals) received over line 96 (line 08) to H.323 packets or another protocol, e.g., H.324 or a proprietary protocol. The details of these conversion processes are well known in the data communications art. Once the data is in the H.323 format, the operations are essentially the same as those described above for the H.323 data connection. Thus, switch A 40A multiplexes these H.323 packets with the other H.323 packets (e.g., the packets from the data terminals). When the packets are received by switch B 40B, an H.323 protocol converter in switch B 40B converts the H.323 packets back to telephone (or video) signals.

In practice, the telephone and video streams typically will be routed over a UDP-based IP trunk 82 rather than a TCP-based IP trunk 80, while the call signaling and control are routed over TCP. As discussed above, information transmissions that do not require the high reliability of a TCP connection may be routed Over a UDP connection. The H.323 standard specifies that video and audio are routed over UDP. Thus, in FIG. 2, the switch will multiplex the calls from the telephones and video terminals over the UDP-based IP trunk 82.

The UDP based IP trunk multiplexing operation is related to the TCP-based IP trunk multiplexing operation. For example, the multiplexing operations are similar and the same encapsulation techniques may be used. Thus, the switch may generate messaging and identifier information as previously discussed in addition, the encapsulated packets may be sent in the UDP payload while some trunk information can be sent via the options portion of the UDP header.

Design considerations related to voice and facsimile transmission over IP may be found in the text *Understanding the Voice Enabled Internet*, Ed Marguiles, Flatiron Publishers Inc., 1996, ISBN-0-936648-91-0 and on the World Wide Web at pulver.com.

Figure 6A:
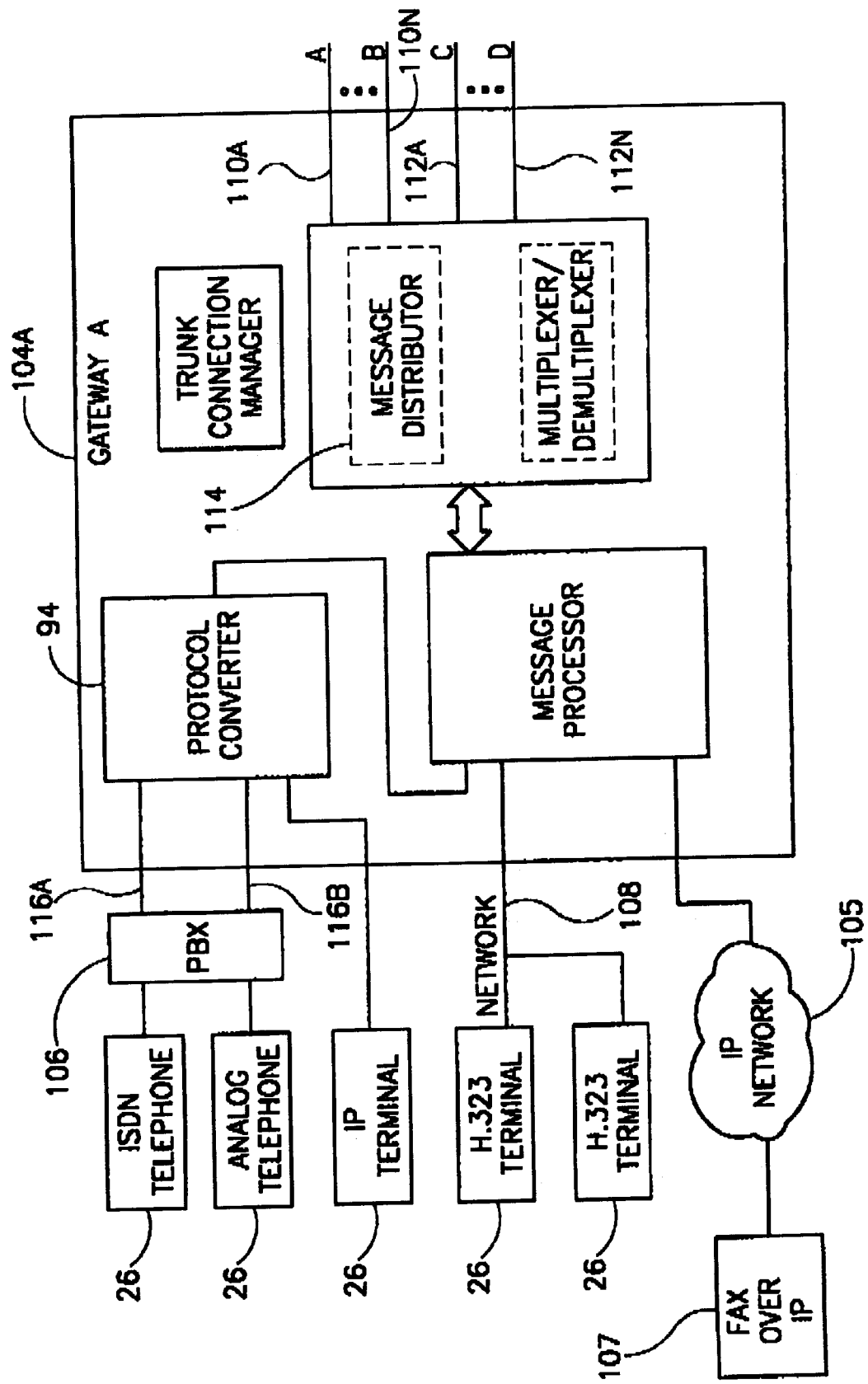
FIGS. 6A and 6B are a block diagram of an embodiment of the invention that multiplexes calls over multiple connections.
Figure 6B:
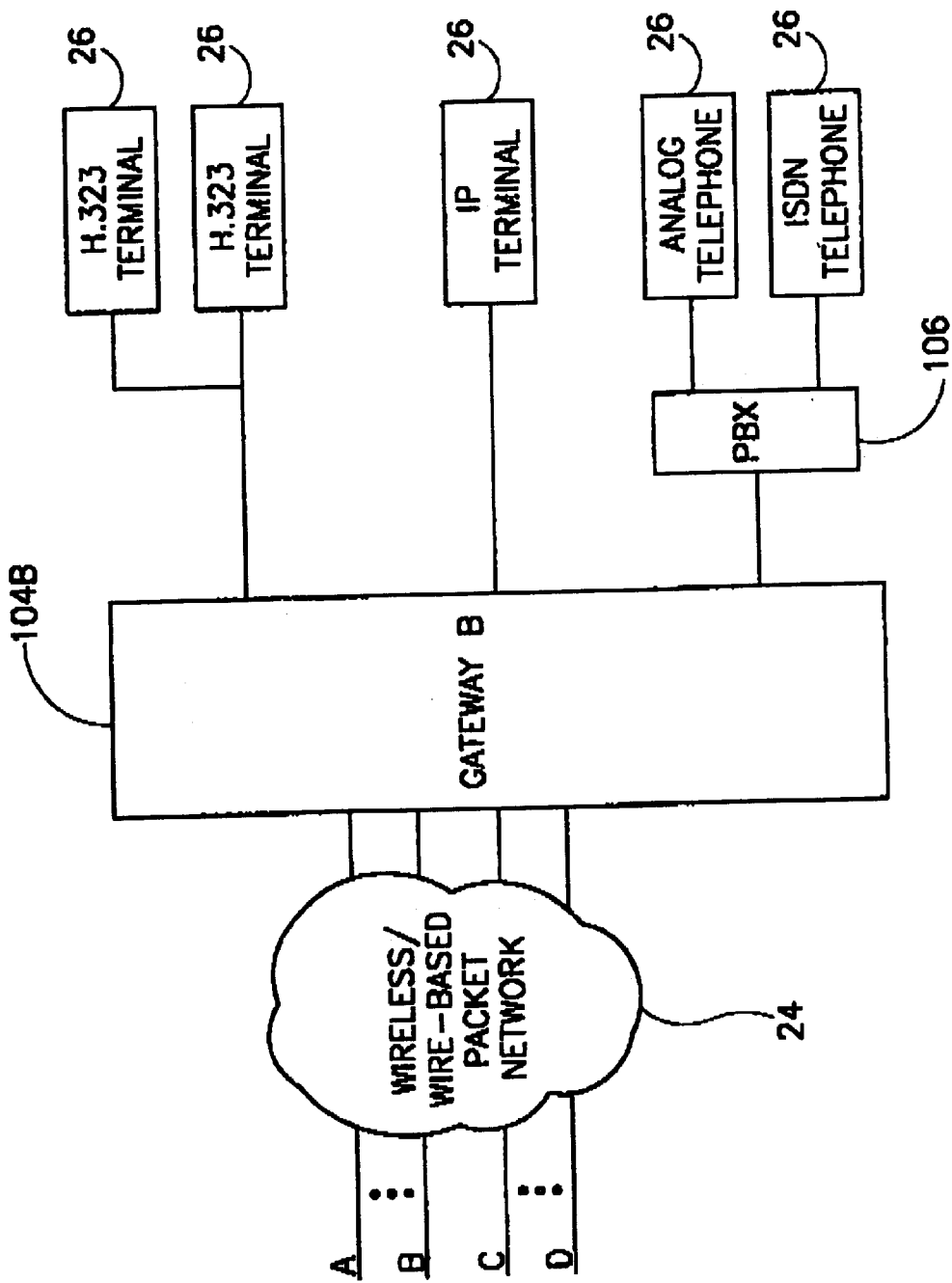

Referring now to FIGS. 6A and 6B (referred to hereafter as FIG. 6), an alternate embodiment of the invention employing multiple IP trunks is described. In FIG. 6, connections between two sets of terminals 26 are established via a pair of gateways 104 connected to an Internet 24. Telephone calls from several of the terminals 26 are as routed through a Private Branch Exchange ("PBX") 106. The gateways 104 are configured to perform the TCP/UDP/IP trunking operation discussed above with the additional feature that multiple trunks are provided.

As above, the system of this embodiment supports terminals running several different protocol standards. For example, the telephones may support the Integrated Services Digital Network ("ISDN") protocol, they may be standard analog sets or they may support some other protocol (not shown). Again, as described above, the data terminals may be protocol-based. Those depicted are IP terminals and H.323 terminals.

The system of FIG. 6 also illustrates that the gateways may trunk data from another IP network 105. In particular packets from a facsimile over IP device 107 may be multiplexed over the IP trunk.

The PBX 106 handles all routing and call distribution for the telephone terminals. The lines (116A and 116B) from the PBX 106 to the gateway 104 typically support the same protocols as the telephones (i.e., ISDN, analog, etc.), however, they typically are multiplexed, high data rate channels.

A gateway maybe a standard component in H.246 (related to H.323). Conventionally, a gateway routes data from an Switched Circuit Network ("SCN") to a Packet Network and vice versa. In general, the gateway provides protocol conversion and other routing operations. In the embodiment of FIG. 6. the gateway 104 routes data between a TCP/IP-based Internet 24 and the Packet Network for the terminals (e.g., the LAN/IP network 108 and the PBX 106) and an IP network 105. Details of an H.323-based gateway may be found in the above-referenced ITU-T documents.

In accordance with the present invention, the gateways are configured to multiplex the calls from the terminals onto a TCP-based IP trunk 110 or a UDP-based IP trunk 112. The multiplexing operation of the gateway 104 is similar to that of the embodiments of FIGS. 1 and 2 except that multiple trunks (110A–110N; 112A–112M) are provided. In addition, the gateways 104 are configured to provide H.323 protocol conversions. For example, an H.323 protocol converter 94 in the gateway (e.g., 104A) converts the telephone calls to H.323 packets. When the packets are received at the remote gateway (e.g., 104B). an H.323 protocol converter 94 (not shown) converts the H.323 packets back to a telephone call.

Turning now to the multiple trunk feature depicted in FIG. 6, instead of routing all calls (or process messages) over a single trunk, the system distributes the incoming calls over several trunks. A message distributor 114 receives each incoming call (process message) and dispatches it to one of the trunks.

A variety of distribution schemes may be employed, depending on the requirements of the system. For example, in a system that uses port cards where each card supports multiple ports, all of the calls (messages) coming in on that card may be routed to the same trunk. Alternatively, the message distributor 114 may use a simple queue whereby all calls (messages) are sent to a given trunk (e.g., 110A) until the traffic on the trunk reaches a given threshold (e.g., 10 calls, 100 messages). Once the threshold is reached, the message distributor 114 routes the calls (messages) to another trunk (e.g., 110N). In another embodiment, the message distributor 114 may route calls (messages) based on the level for service of the trunk. For example, some TCP/IP connections may guarantee high Quality of Service ("QoS") or secure service. In this case, the message distributor may 114 assign the calls (messages) to a trunk having the preferred level of service. This trunk assignment may be based, for example, on predefined assignments or on messages associated with the calls (messages).

As in the embodiments above, the originating gateway (e.g., 104A) multiplexes all of the H.323 packets assigned to a given trunk onto that trunk. The multiplexed packets are sent via the trunk to the remote gateway (e.g., 104B). Typically, a call (message) distribution scheme similar to the one described for the TCP-based. IP trunks is implemented for the UDP based IP trunks.

Figure 7:
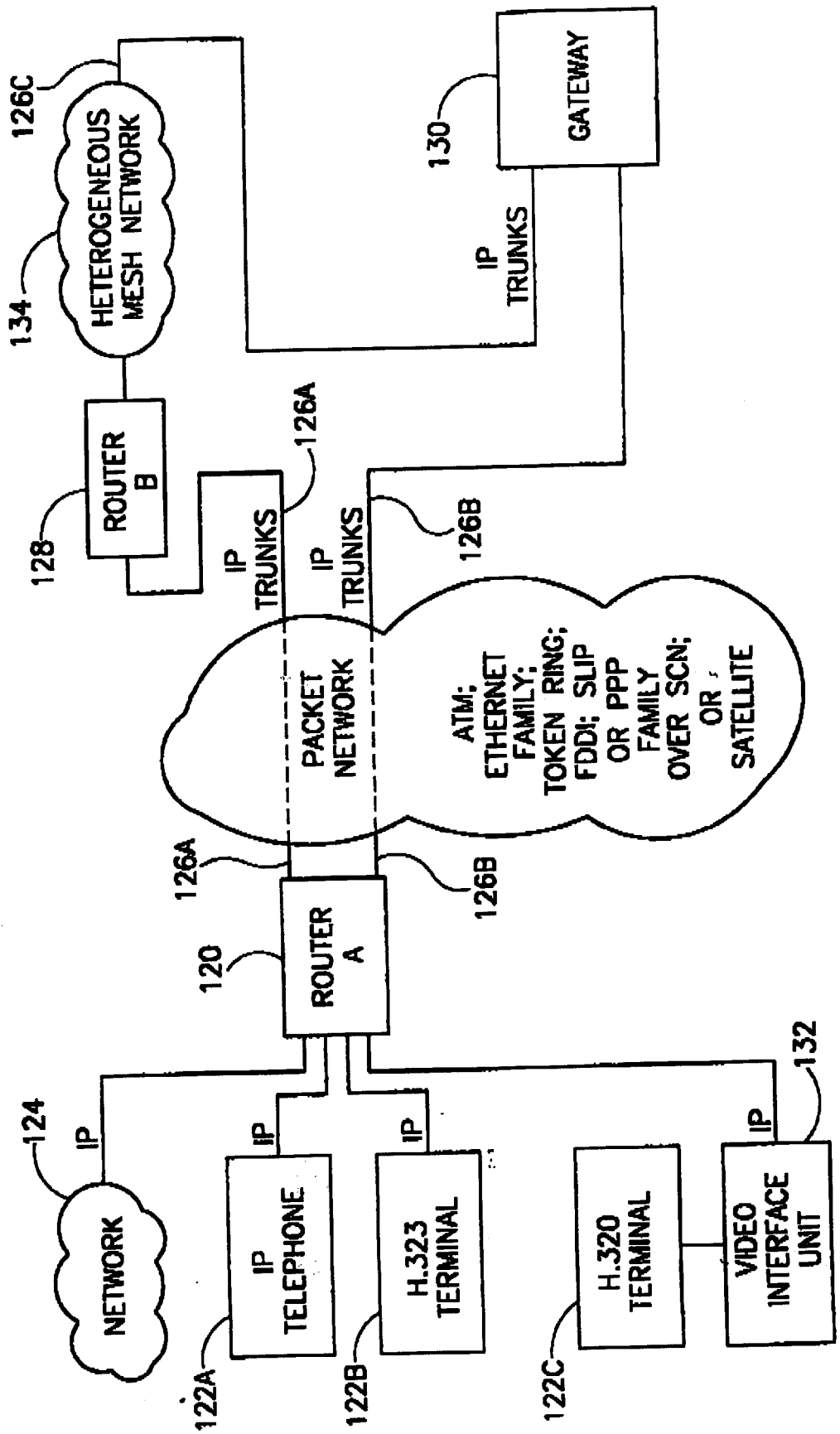
FIG. 7 is a block diagram of an exemplary configuration of a network employing the principles of the invention.

FIG. 7 is a block diagram of an exemplary configuration that illustrates the flexibility of the invention. Here routers and gateways that are distributed throughout a network establish multiple IP trunks between one another. A router A 120 receives calls from other networks (e.g., network 124) and several terminals 122A, 122B and 1C (the calls from the H.320 terminal 122C are converted by a Video Interface Unit 132, for example, a "VIU-323" unit manufactured by RADVision). These calls are distributed over several IP trunks 126A stet 126B stet. One set of IP trunks 126A is established between router A 120 and another router (router B) 128. Another set of IP trunks 126B is established between router A 120 and a gateway 130. A third set of trunks 126C is established between router B 128 and the gateway 130. As FIG. 7 illustrates, IP trunking may be used in any part of the network where it is desirable to realize the advantages of the invention.

FIG. 7 also shown that the present invention may be practiced over a wide variety of networks that support packet-based communications. For example the lower level network may be an Asynchronous Transfer Mode ("ATM") network, an Ethernet family of networks (e.g., 10 Mbit, 100 Mbit, 1 Gbit or 10 Gbit Ethernet), a token ring network or a Fiber Distributed Date Interface ("FDDI") network. The network may also be an SCN using a packet transport protocol such as SLIP, Point-to-Point Protocol ("PPP") or Multi-Level PPP ("MLPPP"). Also, a satellite network may be used. Finally, the network may be wire-based, wireless or a combination of the two (e.g., a heterogeneous mesh 134).

In the embodiments described above, it would be understood by one skilled in the art that the endpoints for a given call need not be of the same type. For example, a connection may be made from an H.323 terminal to a telephone via a gateway and a PBX. Many other configurations are possible using appropriate protocol conversions. Moreover, it would be apparent to one skilled in the art that the components of the illustrated embodiments and other related components may be combined in a variety of ways when implementing teachings of the invention.

The invention thus provides an improved method of routing calls over an IP network. The invention is particularly advantageous in cases where two (or more) gateways, routers, PBXs, etc. are routing a relatively large number of concurrent calls between each other. As an example, two remotely bloated offices of the same corporation typically would have a large number of concurrent calls being made between each office throughout the day. According to the present invention, all of these calls could be routed over an IP network, an Intranet or the Internet, in the efficient way that uses a reduced number of TCP or UDP channels. The invention also applies to one-way distribution of multiple audio or video streams (e.g., video on demand or broadcast for World Wide Web and television applications).

The invention provides a number of advantages over conventional systems including reduced call setup time, reduced call overhead and improved data throughput. Specifically, the three-way handshake used to open a TCP connection within each call and the finish/finish acknowledgment used to end these TCP connections are essentially eliminated. Instead, there can be just one global three-way handshake when the trunk channel is opened. Significantly, data may be passed along with these call setup messages. Similar advantages are obtained at the message tear down stage. The elimination of the above three-way handshake and the tear down messages per call will thus speed up the call setup procedure.

Moreover, the invention reduces the resource a expended by the gateways, etc., related to simultaneously handling a large number of TCP and UDP ports. In particular, the gateway will expend less processing power handling the TCP stack. Moreover, because the gateway will be handling a relatively large number of calls per single TCP connection, the TCP (UDP) window size may be larger, resulting in improved throughout. In addition, the gateways, etc., may not have to open and close as many TCP (UDP) connections and fewer "keep alive" processes are needed. In sum, fewer processing resources of the gateways, etc., will be needed to process the calls.

In addition, through the use of message encapsulation, the invention may reduce the total header-to-payload ratio of the transmitted packet data. As a result, an embodiment constructed according to the invention may provide more data throughput, thereby making more efficient use of the available bandwidth that is provided by the network.

Moreover, by generating a relatively large payload for the calls, the invention makes conferencing a more feasible application. In many systems it is impractical to route a large number of very small packets. To do so efficiently would require the routing hardware to have relatively small buffers. However, this is not practical in many applications. By combining many "small" packets into a single "large" packet, the invention provides a viable solution to this problem. In particular, a more efficient buffer length may be used, there by reducing padding.

The embodiments described above illustrate that the invention may be practiced in a wide variety of configurations. For example, other networking hardware could be used instead of the hardware described in the embodiments above. Routers could be used in place of the gateways for Packet Network connectivity. The functions described above may be distributed among the various components.

Typically, the message processing operations including, for example, packet encapsulation, header assignment, identifier mapping, packet multiplexing and permanent hold of TCPI UDP channels would be implemented as software routines installed on and executed by the corresponding hardware device. In general, the gateways, routers, PBXs and other related switches are adaptable to the software modifications that would be required to implement the invention. Alternatively, one or more of the above operations could be implemented in a hardware device, such as a microprocessor, custom integrated circuit or other device. These design selections would depend on the requirements of the specific implementation.

Exemplary components of those described in the embodiments above include a PBX manufactured by Siemens under the trade name "HICOM 300". A router manufactured by CISCO under the tradename "CISCO 2500". An IP gateway manufactured by RADMision under the tradename "L2W-323 GATEWAY". The terminals (telephone, H.323 terminals, video devices, etc.) descirbed above are available from a variety of vendors (e.g., an H.323 terminal "ARMADA ESCORT 25" by Vcon), any of which may be suitable provided that they conform to the protocol standards utilized in the particular configuration.

From the above, it may be seen that the invention provides an effective call multiplexing scheme for packet networks. While certain specific embodiments of the invention are disclosed as typical, the invention is not limited to these particular forms, but rather is applicable broadly to all such variations as fall within the scope of the appended claims. To those skilled in the art to which the invention pertains many modifications and adaptations will occur. For example, various packet multiplexing and demultiplexing techniques and methods of identifying multiplexed data may used in practicing the invention. A variety of formats may be used for the headers and the message structure in general. A variety of transport protocols may be used. A number of methods can be used to encapsulate the packets, to provide call setup, and to perform other call handling operations. Similarly, various methods of call distribution could be employed to support multiple trunks. Thus, the specific structures and methods discussed in detail above are merely illustrative of a few specific embodiments of the invention.

What is claimed is:

1. A method of routing data streams over a packet switched network, said method comprising:
   receiving two or more data streams from at least two sources;
   encapsulating call setup messages associated with said two or more data streams within at least one packet of a communication channel;
   establishing said communication channel over the packet switched network using an open transport protocol;
   transmitting at least a portion of said two or more data streams over said communication channel; and
   maintaining said communication channel past a termination of any given one or more data streams.

2. The method of claim 1, further comprising associating each of said two or more data streams with an identifier.

3. The method of claim 1, wherein said termination further comprises permanently maintaining said communication channel.

4. The method of claim 1, wherein said packet switched network is an internet IP network.

5. A method according to claim 4, wherein said packet of said communication channel is a TCP/IP packet.

6. A method according to claim 4, wherein said packet of said communication channel is a UDP/IP packet.

7. The method of claim 1, wherein said packet network is over at least one of a wireless network, a wire-based network and a heterogeneous mesh network.

8. The method of claim 1, wherein packet network is over a lower level network that supports packet-based communications including at least one of an ATM network, an Ethernet-based network and a FDDI network.

9. A method according to claim 1, wherein said packet network is over an SCN that uses a packet transport protocol.

10. A method according to claim 1, wherein said establishing comprises establishing a communication channel between two internet protocol switches.

11. A method according to claim 1, wherein at least one of said two or more data streams is associated with a H.323 call.

12. A method according to claim 1, at least one of said two or more data streams is associated with a facsimile over internet protocol call, a telephone call, an H.324 call and an H.320 call.

13. A method according to claim 1 further including the steps of:
    establishing a plurality of said communication channel over the packet switched network using an open transport protocol; and
    multiplexing said two or more data streams over said plurality of communication channels.

14. A system for routing two or more data streams from two or more sources over a packet switched network, said system comprising:
    an encapsulator for encapsulating call setup messages associated with said two or more data streams within at least one packet of a communication channel;
    a trunk connection manager for establishing a said communication channel over the packet switched network using an open transport protocol;
    wherein said trunk connection manager is adapted to maintain said communication channel past a termination of any given one or more data streams.

15. A system according to claim 14, further including an identifier generator for providing at least one identifier for each of said two or more data streams.

16. A system according to claim 14, wherein said trunk connection manager maintains a channel semi-permanent connection.

17. A system according to claim 14, wherein said packet switched network is an internet protocol network.

18. A system according to claim 14, wherein said packet switched network is over at least one of a wireless network, a wire-based network and a heterogeneous mesh network.

19. A system according to claim 14, wherein said packet switched network is over a lower level network that supports packet-based communications including at least one of an ATM network, an Ethernet-based network and a FDDI network.

20. A system according to claim 14, wherein said packet switched network is over an SCN that uses a packet transport protocol.

21. A system according to claim 14, wherein said communication channel is established between two internet protocol switches.

22. A system according to claim 14, wherein said open transport protocol is TCP.

23. A system according to claim 14, wherein said open transport protocol is UDP.

24. A system according to claim 14, wherein at least one of said two or more data streams is an H.323 call.

25. A system according to claim 14, wherein at least one of said two or more data streams is a voice over internet protocol call.

26. A system according to claim 14, wherein at least one of said two or more data streams is at least one of a facsimile over internet protocol call, a telephone call, an H.324 call and an H.320 call.

27. A system according to claim 14, further comprising a multiplexer; wherein said call manager establishes a plurality of said communication channels over the packet switched network, and wherein said multiplexer is adapted to multiplex said calls over said plurality of said communication channels.

28. A method according to claim 1, wherein at least one of said two or more data streams is associated with a voice over Internet protocol call.

* * * * *